United States Patent
Trocke et al.

(10) Patent No.: US 9,288,676 B2
(45) Date of Patent: Mar. 15, 2016

(54) TRUSTED SENSOR DATA UNAFFECTED WHEN AN APPLICATION PROCESSOR OPERATES IN AN UNLOCKED STATE

(71) Applicant: MOTOROLA MOBILITY LLC, Libertyville, IL (US)

(72) Inventors: Robert S. Trocke, Caledonia, WI (US); Gregory R. Black, Vernon Hills, IL (US); Armin W. Klomsdorf, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 159 days.

(21) Appl. No.: 14/031,725

(22) Filed: Sep. 19, 2013

(65) Prior Publication Data
US 2014/0378098 A1    Dec. 25, 2014

Related U.S. Application Data

(60) Provisional application No. 61/837,327, filed on Jun. 20, 2013.

(51) Int. Cl.
| | |
|---|---|
| H04W 12/08 | (2009.01) |
| H04W 52/18 | (2009.01) |
| G06F 21/83 | (2013.01) |

(52) U.S. Cl.
CPC .............. *H04W 12/08* (2013.01); *G06F 21/83* (2013.01); *H04W 52/18* (2013.01)

(58) Field of Classification Search
CPC ...... G06F 21/83; H04W 12/08; H04W 52/18; H04W 52/288
See application file for complete search history.

(56) References Cited

U.S. PATENT DOCUMENTS

| | | | |
|---|---|---|---|
| 6,657,595 B1 | 12/2003 | Alameh et al. | |
| 7,146,139 B2 | 12/2006 | Nevermann | |
| 2012/0071195 A1 | 3/2012 | Chakraborty et al. | |
| 2012/0214412 A1 | 8/2012 | Schlub et al. | |
| 2012/0214422 A1* | 8/2012 | Shi et al. | 455/67.11 |
| 2014/0187281 A1* | 7/2014 | Faraone et al. | 455/522 |
| 2014/0370929 A1* | 12/2014 | Khawand et al. | 455/522 |

OTHER PUBLICATIONS

International Search Report and Written Opinion for PCT/US2014/043273 mailed Sep. 19, 2014.
"Android Thread: Phones/Apps/Mods—p. 923—Team—BHP", Retrieved from the Internet: http://www.team.bhp.com/forum/gadgets-computers-software/83859-android-thread-phones-apps-mods-923.html retrieved on Sep. 5, 2014, Feb. 14, 2013.

* cited by examiner

*Primary Examiner* — Liton Miah
(74) *Attorney, Agent, or Firm* — Morris & Kamlay LLP (57) ABSTRACT

Arrangements described herein relate to controlling RF communications by a communication device. Raw sensor data from one or more sensors can be received by a sensor processor. The sensor processor processes the raw sensor data to generate processed sensor data. An application processor processes a portion of the processed sensor data. The application processor is configured to operate in a locked state in which a user is not allowed to alter the at least one secured application and operate in an unlocked state in which the user is allowed to alter the at least one secured application. A portion of the processed sensor data is received from the sensor processor by a communications processor and further processed. The processed sensor data received by the communications processor from the sensor processor is trusted sensor data not affected by the application processor when the application processor operates in the unlocked state.

20 Claims, 2 Drawing Sheets

```
┌─────────────────────────────────────────────────────────┐
│ Receive, by a sensor processor, raw sensor data from at │
│ least one sensor and process, by the sensor processor,  │
│ the raw sensor data to generate processed sensor data   │
│                          205                            │
└─────────────────────────────────────────────────────────┘
                              │
                              ▼
┌─────────────────────────────────────────────────────────┐
│ Receive, by an application processor, at least a first  │
│ portion of the processed sensor data from the sensor    │
│ processor and further process, by the application       │
│ processor, the first portion of the processed sensor    │
│ data in at least one secured application executed by    │
│ the application processor, the application processor    │
│ configured to operate in a locked state in which a user │
│ is not allowed to alter the at least one secured        │
│ application and operate in an unlocked state in which   │
│ the user is allowed to alter the at least one secured   │
│ application                                             │
│                          210                            │
└─────────────────────────────────────────────────────────┘
                              │
                              ▼
┌─────────────────────────────────────────────────────────┐
│ Receive, by a communications processor, at least a      │
│ second portion of the processed sensor data from the    │
│ sensor processor and further process, by the            │
│ communications processor, the second portion of the     │
│ processed sensor data to control RF communications by   │
│ the communication device, wherein the second portion of │
│ the processed sensor data received by the communications│
│ processor from the sensor processor is trusted sensor   │
│ data not affected by the application processor when the │
│ application processor operates in the unlocked state    │
│                          215                            │
└─────────────────────────────────────────────────────────┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ┐
│ Receive, by at least one antenna tuner, at least a      │
│ third portion of the processed sensor data from the     │
│ sensor processor and further process, by the antenna    │
│ tuner, the third portion of the processed sensor data   │
│ to control impedance matching between an antenna of the │
│ communication device and at least one other component   │
│ of the communication device, wherein the third portion  │
│ of the processed sensor data received by the antenna    │
│ tuner from the sensor processor is trusted sensor data  │
│ not affected by the application processor when the      │
│ application processor operates in the unlocked state    │
│                          220                            │
└ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 2

TRUSTED SENSOR DATA UNAFFECTED WHEN AN APPLICATION PROCESSOR OPERATES IN AN UNLOCKED STATE

CROSS-REFERENCE TO RELATED APPLICATIONS

This application claims the benefit of application No. 61/837,327, filed on Jun. 20, 2013, which is fully incorporated herein by reference.

BACKGROUND OF THE INVENTION

Arrangements described herein relate to mobile communications and, more particularly, to identifying tuning states for transmitting radio frequency (RF) energy.

The Federal Communications Commission (FCC) has adopted limits for exposure to radio frequency (RF) energy. These limits are given in terms of a unit referred to as the specific absorption rate (SAR), which is a measure of the amount of RF energy absorbed by the body when using a mobile phone. In order to comply with FCC SAR limits under a variety of use conditions, mobile communication devices typically employ a reduction in transmit power when the communication devices are proximate to users' bodies. This reduction in transmit power oftentimes is referred to as "SAR cutback."

Users sometimes unlock application processors on mobile communication devices in order to attain privileged control, sometimes referred to as "root access," to the communication devices' operating system and/or secure software. With privileged control, the user can alter the operating system and/or secure software. When this occurs, mobile communication devices typically default to a state of maximum SAR cutback in order to ensure that the communication devices continue to comply with the FCC SAR limits, even if users have made changes to the operating systems and/or secure software.

BRIEF DESCRIPTION OF THE DRAWINGS

FIG. 2 is a flowchart presenting a method of controlling RF communications by a communication device, which is useful for understanding various arrangements described herein.

DETAILED DESCRIPTION

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Arrangements described herein relate to a communication device in which the application processor can be unlocked, thus allowing a user to change the operating system and/or applications on the communication device, without defaulting to state of maximum of SAR cutback. To ensure user changes to the operating system and/or applications do not interfere with the communication device's ability to continually comply with Federal Communications Commission (FCC) specific absorption rate (SAR) limits, when the application processor is unlocked, only trusted sensor data is processed to determine the appropriate amount of SAR cutback to be applied to the transmit power level. In this regard, when the application processor is unlocked, the communication device's communications processor (e.g., baseband processor) exclusively processes trusted sensor data received from a sensor processor secured against being unlocked. This trusted sensor data is processed by the communications processor to determine the amount of SAR cutback to be applied to the transmit signal.

Figure 1:
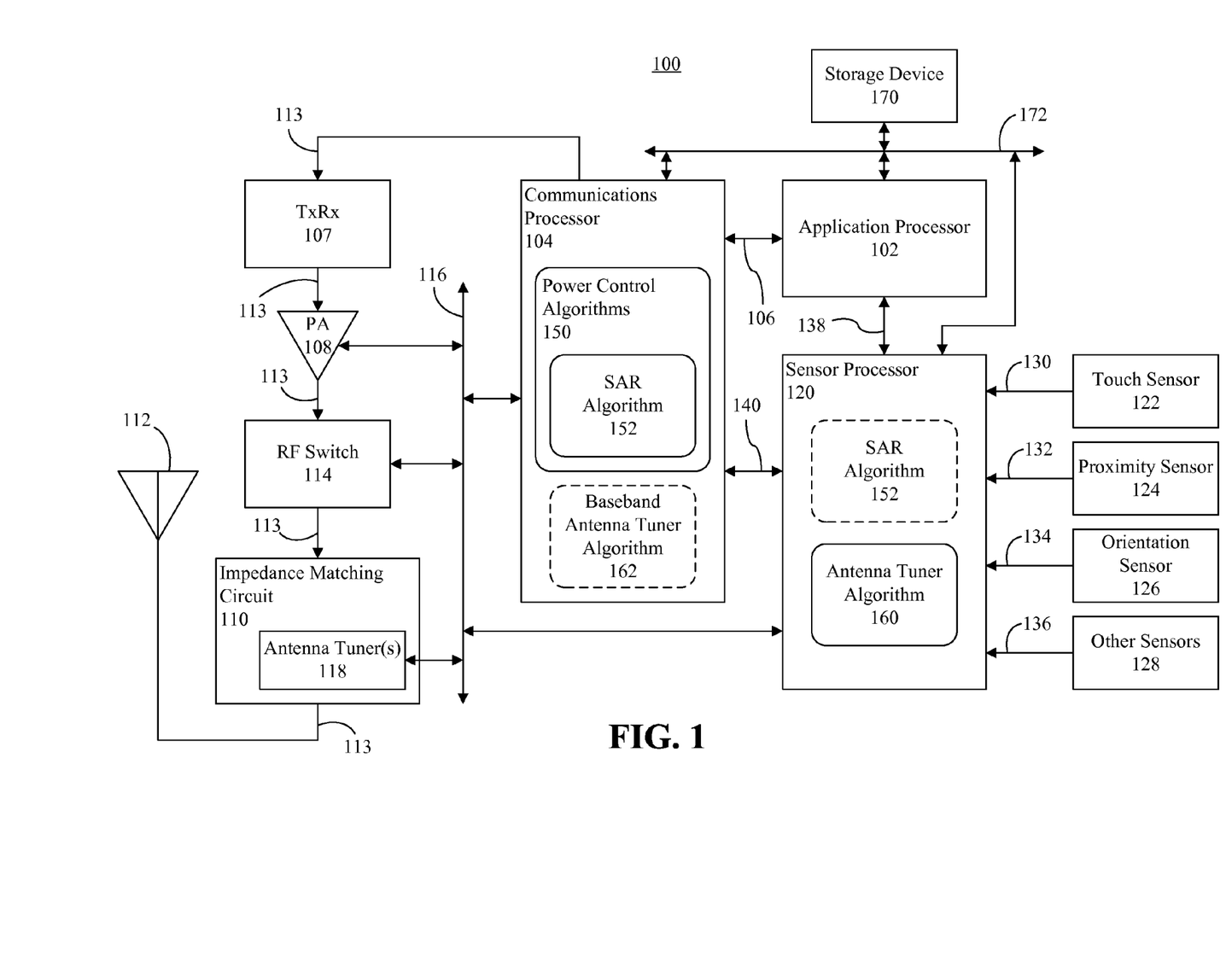
FIG. 1 depicts a block diagram of a communication device, which is useful for understanding various arrangements described herein.

FIG. 1 depicts a block diagram of a communication device 100, which is useful for understanding various arrangements described herein. As used herein, the term "communication device" means a device configured to transmit and receive communication signals comprising voice data and/or non-voice data. The communication device 100 can be a mobile phone (e.g., a cellular telephone, a smart phone, a push-to-talk (PTT) radio, etc.), a portable phone, a tablet computer, a wearable computer, a portable gaming console, or any other device configured to transmit and receive communication signals and which a user may hold proximate to the user's body.

The communication device 100 can include an application processor 102 configured to execute an operating system and one or more applications. The application processor 102 represents the main data-processing element within the communication device 100. It can perform tasks, other than control functions, that include executing the operating system of the communication device 100, as well as applications that run in the operating system environment.

The application processor 102 can be configured to be unlockable, meaning that a user may unlock the application processor 102 to make changes the operating system and/or applications, or replace the operating system and/or applications with a new operating system and/or new applications. A user may unlock the application processor 102 via a user interface or other suitable menu, or by entering certain commands into the application processor 102.

The communication device 100 also can include a communications processor 104 configured to securely manage radio functions in the communication device 100. Such radio functions can include, but are not limited to, controlling transmission and reception of RF signals over a cellular communication network, or any other RF communication network. The communications processor 104 can be, for example, a baseband processor. The communications processor 104 can be communicatively linked to the application processor 102 via a communication link 106. The communication link 106 can be, for example, provided over a Serial Peripheral Interface (SPI) bus. The communications processor 104 can include one or more modems (not shown). Alternatively, one or more modems can be provided as components separate from, but communicatively linked to, the communications processor 104. The applications processor 102 can be communicatively linked to the modem(s) via a high speed inter-chip (HSIC) universal serial bus (USB), or another suitable communication bus.

The modem(s) can be communicatively linked to a transceiver 107 configured to modulate and demodulate signals to convert signals from one form to another, and can transmit and/or receive such signals over one or more various wireless communication networks. The modem(s) can be commutatively linked to the transceiver 107 using a suitable analog signal interface or a mobile industry processor interface (MIPI), such as a MIPI digital RF interface.

The transceiver 107 can communicate data via 2G, 3G, 4G, GSM, LTE, UMB, GPRS, EUTRAN, TDMA, CDMA, WCDMA, UMTS, OFDM, HSPA+, etc. The invention is not limited to these examples, however, and the transceiver 107 can be configured to communicate signals in accordance with any suitable communications standards, protocols, and/or architectures, or a suitable combination of such standards, protocols, and/or architectures. In transmit mode, the transceiver 107 can modulate uplink baseband signals generated by the communications processor 104 to uplink RF signals (i.e. transmit signals), and communicate the uplink RF signals to a power amplifier 108, which can amplify the uplink RF signals for transmission via an impedance matching circuit 110 and one or more antennas 112. For illustration purposes, the transmit mode signal path 113 is shown in FIG. 1. The transceiver 107 also can received downlink RF signals (i.e., received signals) via the antenna(s) 112 and the impedance matching circuit 110, and de-modulate the received downlink RF signals to downlink baseband signals, which may be processed by the communications processor 104. An RF switch 114 can be provided to switch between the transmit mode and receive mode signal paths.

The communications processor 104 can be communicatively linked to the power amplifier 108, impedance matching circuit 110, and RF switch 114 via a suitable control bus 116. In one arrangement, the control bus 116 can be implemented in accordance with the Mobile Industry Processor Interface (MIPI) Alliance Radio-Frequency Front-End (RFFE) Control Interface, as specified by the MIPI Alliance Specification for RFFE Version 1.00.00-3, dated May 2010, or any subsequent releases. Each component 104, 108, 110, 114 connected to the control bus 116 can be provided a respective control interface, for example a MIPI RF-FE control interface. In another arrangement, the control bus 116 can be a SPI bus and suitable SPI control interfaces can be provided for the various components. Any other suitable control bus may be used and the present arrangements are not limited in this regard.

The communication device 100 also can include one or more antenna tuners 118, which represents adjustable components in the impedance matching circuit 110, for example resistors, capacitors, inductors and/or a tunable varactor. In one arrangement, the capacitors can be implemented in a micro-electro-mechanical systems (MEMS) capacitor array, which can comprise an array of capacitors selected as needed by the antenna tuner(s) 118 using RF switches (not shown). The antenna tuner(s) 118 can be adjusted to optimize impedance matching provided by the impedance matching circuit 110. Specifically, the antenna tuner(s) 118 can be adjusted to optimize impedance matching between the power amplifier 108 and the antenna 112 for uplink RF signals, and optimize impedance matching between the antenna 112 and the transceiver 107 for downlink RF signals.

In one arrangement, the communication device 100 further can include a wireless network adapter (not shown) configured to communicate data via IEEE 802 wireless communications, for example, 802.11 and 802.16 (WiMax), mobile WiMax, WPA, or WPA2. The communication device 100 also can include a transceiver (not shown) configured to communicate signals in accordance with the Bluetooth® protocol and/or a transceiver configured to communicate using near field communications. In one aspect, the wireless network adapter and/or transceiver can be implemented using components distinct from the communications processor 104, and can be connected to the application processor 102 via one or more suitable communication links. In another aspect, the wireless network adapter and/or transceiver can be included in the communications processor.

The communication device 100 further can include a sensor processor 120 configured to securely receive and process sensor signals from one or more sensors, for example a touch sensor 122, a proximity sensor 124, and orientation sensor 126 and other sensors 128. The touch sensor 122 can detect whether a user is touching the communication device 100, and generate corresponding data indicating how the user is touching the communication device 100. The user, for example, might hold the communication device 100 (e.g. a cellular phone) in his left or right hand in a "left-hand" or "right-hand position," respectively, between his head and hand as he presses the device to his ear in a "head-and-hand position," or in a case worn against his hip in a "body position." In one arrangement, the touch sensor 122 can include capacitive sensors that detect anything contacting the communication device that is conductive or has a dielectric constant different than that of air. By distributing larger numbers of capacitive sensors throughout a housing of the communication device 100, user positions can be determined with great accuracy.

In other arrangements, the touch sensor 122 can utilize pressure sensitive areas of the communication device 100 and photo sensors to measure the user's contact points with the communication device 100. Where pressure sensitive areas are used, a change in pressure can be recorded as a portion of the user's body is pressed up against such an area. For photo sensors, contact by the user blocks the light received by the sensors.

The proximity sensor 124 can detect proximity of the communication device 100 to the hand, head, and/or body of a user, regardless of whether the user actually is touching the communication device 100. In one arrangement, the proximity sensor 124 can include one or more light emitting diodes (LEDs) as a source of infrared light which is reflected by proximal objects and recorded by the sensor. In another arrangement, the proximity sensor 124 can include one or more capacitive sensors that detect proximity of objects to the communication device 100. In another arrangement, a camera within the communication device 100 can be used to perform the function of the proximity sensor 124.

The orientation sensor 126 can detect an orientation of the communication device 100. In this regard, the orientation sensor 126 can generate data indicating how the communication device 100 is oriented in one or more spatial dimensions. In one arrangement, the orientation sensor 126 can include accelerometers and magnetic-field sensors to detect such orientation. In a position assumed by the communication device while the user is texting, for example, the orientation sensor 126 can determine that the device is held with its front face up inclined relative to the ground at an angle of between 40 and 50 degrees while the horizontal component of its longitudinal axis is directed in a south-easterly direction.

The other sensors 128 can include, for example, a touch screen sensor that detects user touches on a touch screen, an accelerometer that detects acceleration/movement of the communication device 100, a global positioning system (GPS), a local positioning system, and or any other desired sensors.

The various sensors 122-128 can be communicatively linked to the sensor processor 120 via respective communication links 130, 132, 134, 136. The sensor processor 120 can comprise hardware assistance and dedicated computational resources for the sensors 122-128. In one arrangement, one or more of the communication links 130-136 can be implemented in accordance with the I2C serial interface specification, for example using a shared I2C bus, though some sensors 122-128 may be linked to sensor processor 120 using a serial peripheral interface (SPI) bus. The present arrangements are not limited to these examples, however. Further, one or more sensors, for example a touch screen sensor, also can be directly connected to the application processor 102 to minimize latency.

In one arrangement, the sensor processor 120 can function as a sensor hub, meaning that the sensor processor 120 receives sensor data from all sensors 122-128 of the communication device 100, processes such sensor data, which may include grouping and formatting the data, and communicates the processed sensor data to other components of the communication device, such as the application processor 102, the communications processor 104 and the antenna tuner(s) 118.

The sensor processor 120 can be communicatively linked to the antenna tuner (s) 118 via the control bus 116 and can be provided a respective MIPI RF-FE control interface. The sensor processor 120 can be communicatively linked to the application processor 102 via a communication link 138, for example over a SPI bus or communication link configured in accordance with the I2C serial interface specification. The sensor processor 120 also can be communicatively linked to the communications processor 104 via a communication link 140, for example over a SPI bus or communication link configured in accordance with the I2C serial interface specification. In one non-limiting arrangement, the communication link 140 can be optimized for lower data rates than the data rates used by the sensor processor 120 to communicate with the application processor 102 via the communication link 138.

The communications processor 104 and sensor processor 120 each can be secured against being unlocked by a user using appropriate security measures. For example, to ensure security, the communications processor 104 and sensor processor 120 each can be provided an encryption key which may be matched to, or paired with, an encryption key used to encrypt software/firmware provided to the processors 104, 120. The communications processor 104 and sensor processor 120 can use the same encryption key, or the processors 104, 120 can be assigned different encryption keys. The processors 104, 120 can use their respective encryption keys to determine whether any software/firmware provided to them is encrypted with an appropriate encryption key, and only boot off of software/firmware having the appropriate encryption key. The encryption key provided to the processors 104, 120 can be stored into memory registers not accessible to a user, or stored in another suitably secure manner. In one arrangement, the security can be implemented in accordance with public-key infrastructure (PKI). Nonetheless, any other suitable security process can be used to secure the processors 104, 120 against user access to secured software/firmware, and the present arrangements are not limited in this regard.

In operation, the various sensors 122-128 can generate raw sensor data, and the sensor processor 120 can receive the raw sensor data from the sensors 122-128 as secure (i.e., trusted) inputs. The sensor processor also 120 can receive data from the communications processor 104 indicating the state of the modem(s). Further, the sensor processor 120 can receive hardware state information indicating various states of the communication device 100, for example whether the communication device 100 is connected from an external charger. The hardware state information can be received via a general purpose input/output (GPIO) input on the sensor processor 120, and received from various components of the communication device 100, such as power management components, audio processing components, etc. The fore mentioned data can be received by the sensor processor 120 as primary secure inputs. Specifically, because the sensor processor 120 and the communications processor 104 are secured against being unlocked by a user, the data is unaffected by changes a user may make to software executed by the application processor 102.

The sensor processor 120 also can receive secondary inputs. The secondary inputs can include, for example, data communicated from the application processor 102 to the sensor processor 120, such as communication device state information provided by the application processor, indirect sensor data received from the application processor 102, data received via a wireless network adapter or transceiver connected directly to the application processor 102, etc.

Since the application processor 102 may be unlocked by a user, and the user may alter the operating system and/or secure software of the communication device 100, the secondary inputs can be considered to be unsecure (i.e., untrusted) data when the application processor 102 is unlocked. In one arrangement, while the application processor 102 remains locked, however, the secondary inputs can be considered to be secure data. In this regard, the application processor 102 can communicate to the sensor processor 120 data indicating whether the application processor 102 is locked or unlocked. In another arrangement, the secondary inputs always can be considered to be unsecure data.

The sensor processor 120 can process the raw sensor signals received from the sensors 122-128 to generate processed sensor data that is trusted sensor data. The sensor processor 120 also can receive other primary secure inputs, and process such data to generate processed sensor data that is trusted sensor data. Further, the sensor processor 120 can receive secondary inputs and process secondary inputs to generate processed sensor data. If the secondary inputs are considered to be secure data, the processed sensor data generated from the secondary inputs are trusted sensor data. If the secondary inputs are considered to be unsecure data, the processed sensor data generated from the secondary inputs are untrusted sensor data. The sensor processor 120 can distinguish processed sensor data generated from secure inputs from processed sensor data generated from unsecure inputs, and communicate the sensor data generated from secure inputs to the communications processor 104 and the antenna tuner(s) 118 to implement power control and tuning of the impedance matching circuit 110, respectively.

The communications processor 104 can execute one or more power control algorithms 150 configured to control the transmit power level of the communication device 100. In one arrangement, the power control algorithms 150 can include an SAR algorithm 152 that determines an amount of power reduction (i.e., SAR cutback) to be applied to uplink RF transmission based on the processed data generated from secure inputs (e.g., trusted sensor data). The processed data can include not only processed sensor data, but also processed data generated other secure inputs. The processed data may include all such data generated from secure inputs, or a portion of the data generated from secure inputs. The amount of power reduction can be selected to ensure the transmit power level of the communication device 100 complies with FCC SAR limits.

The determination of the amount of power reduction to apply can be based on, for example, the orientation of the communication device 100, proximity of the communication device 100 to a user, whether the communication device 100 is being held by the user, the manner in which the communication device 100 is being held, etc. In illustration, the processed data can indicate whether a user's body is or is not in a certain position relative to the antenna 112, which can provide an indication of the amount of RF energy being absorbed by the user's body when using the communication device 100. For example, the following information inferred from the processed data is relevant to determining the amount of power reduction to apply and suggests that the user is not holding the communication device 100 in a head-and-hand position: the communication device 100 is not in a voice call, a modem for the communication device 100 is aware of occasional data bursts; a web browser application is open and active on the communication device 100; the touch sensor 122 detects that the communication device 100 is being gripped at its left and right edges like a game controller; a sliding keyboard for the communication device 100 is exposed; and the audio earpiece for the communication device 100 is not active. Conversely, data that indicates a state opposite that described above would suggest that the communication device 100 is being held in the head-and-hand position, and thus the amount of power reduction should be adjusted according to reduce the transmit power.

In another arrangement, in lieu of the SAR algorithm 152 being a component of the power control algorithms 150, the SAR algorithm 152 can be executed by the sensor processor 120. In this arrangement, the SAR algorithm 152 can process all of the data received as secure inputs (e.g., raw sensor data), or a portion of the secure data, to generate the processed sensor data that is trusted data, and communicate the processed sensor data to the power control algorithm(s) 150. The power control algorithm(s) 150 can further process the processed data to determine an amount of power reduction (i.e., SAR cutback) to be applied to uplink RF transmission.

When the network adapter and/or transceiver is used while also transmitting RF signals via the power amplifier 108 and antenna 112, this can increase the total RF signal power generated by the communication device 100. The SAR algorithm 152 can take this into consideration when determining an amount of power reduction to apply to the RF uplink signal transmitted via the antenna 112. If the network adapter and/or transceiver are components of the communications processor 104, the SAR algorithm 152 can receive corresponding data from the communications processor 104. Otherwise, the SAR algorithm 152 can receive the corresponding data directly from the network adapter and/or transceiver, or from the application processor 102, for example when the application processor 102 remains locked.

Further, an antenna tuner algorithm 160 can be executed by the sensor processor 120 to generate processed data used by the antenna tuner(s) 118 to tune the impedance matching circuit 110. Again, the processed data can include not only processed sensor data, but also processed data generated other secure inputs. The processed data may include all such data generated from secure inputs, or a portion of the data generated from secure inputs. The processed data generated by the antenna tuner algorithm 160 can be communicated to the antenna tuner(s) 118, which can further process such data to tune the impedance matching circuit 110 to match the impedance of the antenna 112 to the power amplifier 108 amplifying uplink RF signals and/or to match the impedance of the antenna 112 to the modem receiving downlink RF signals.

In illustration, the processed data can indicate whether a user's body is or is not in a certain position relative to the antenna 112, similar to that described above with respect to the SAR algorithm 152 determining the amount of transmit power reduction to apply. If the processed data indicates the communication device 100 is being held in a head-and-hand position, the antenna tuner(s) 118 can tune the impedance matching circuit 110 for the impedance of the antenna 112 resulting from the communication device 100 being held in this position. If, however, the processed data indicates the communication device 100 is not proximate to the user's body, the antenna tuner(s) 118 can tune the impedance matching circuit 110 for the impedance of the antenna 112 resulting from the communication device 100 being held in this position. A variety of parameters influence the antenna's impedance in any given circumstance, and such parameters are detected by the sensors 122-128 and other inputs.

In another arrangement, the antenna tuner algorithm 160 can perform a first level of processing on sensor data to distil sensor inputs, separating secure (i.e., trusted) data from unsecure (i.e., untrusted) data, and communicate the processed secure data to a baseband antenna tuner algorithm 162 executing on the communications processor 104. The baseband antenna tuner algorithm 162 can further process the processed secure data to further determine antenna tuning to be performed by the antenna tuner(s) 118, and communicate corresponding data to the antenna tuner(s) 118. The antenna tuner(s) 118 can process such data to tune the impedance matching circuit 110 to match the impedance of the antenna 112 to the power amplifier 108 amplifying uplink RF signals and/or to match the impedance of the antenna 112 to the modem receiving downlink RF signals.

The sensor processor 120 also can communicate at least a portion of the processed sensor data, or raw sensor data, to the application processor 102. The application processor 102 can further process such data in at least one secured application executed by the application processor 102. For example, the application processor 102 can process the data for applications requesting/requiring data relating to proximity of the communication device 100 to the user, data relating to whether the communication device is being touched, data relating to the orientation of the communication device, etc.

In one arrangement, the application processor 102 can perform processing on the sensor data and communicate the further processed sensor data to the SAR algorithm 152 (regardless of whether the SAR algorithm 152 executes on the communications processor 104 or the sensor processor 120), the antenna tuner algorithm 160 and/or the baseband antenna tuner algorithm 162.

When the application processor 102 is in a locked state, the SAR algorithm 152 can consider the processed sensor data and other data received from the application processor 102 to be trusted data, and use such data to control the transmit power level of the communication device 100 in order to comply with the FCC SAR limits. Similarly, when the application processor 102 is in a locked state, the antenna tuner algorithm 160 and/or the baseband antenna tuner algorithm 162 can consider the processed sensor data and other data received from the application processor 102 to be trusted data, and use such data to control the antenna tuner(s) 118.

When the application processor 102 is in an unlocked state, however, the SAR algorithm 152 can consider the processed sensor data and other data received from the application processor 102 to be untrusted data, and thus not use such data to control the transmit power level of the communication device 100. Similarly, when the application processor 102 is in an unlocked state, the antenna tuner algorithm 160 and/or the baseband antenna tuner algorithm 162 can consider the processed sensor data and other data received from the application processor 102 to be untrusted data, and not use such data to control the antenna tuner(s) 118.

The various algorithms 150, 152, 160, 162 can comprise computer program code that, when executed configures the respective processors 104, 120 to perform to perform the respective executable operations described herein. The computer program code can be stored on at least one computer-readable (or computer-usable) storage device 170. As used herein, the term "computer-readable storage device" means a device comprising a tangible, non-transitory, storage medium configured to store computer-readable program code. Examples of a computer-readable storage device, include, but are not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. Computer program code for carrying out operations for aspects of the arrangements described herein may be written in any combination of one or more programming languages, including an object oriented programming language such as Java™ Smalltalk, C++ or the like and conventional procedural programming languages, such as the "C" programming language or similar programming languages.

In one arrangement, the algorithms 150-162 can be stored on a computer-readable storage device 170. The storage device 170 also can store applications executed by the application processor 102, or such applications can be stored on another storage device 170. The storage device 170 can be communicatively linked to the communications processor 104, the sensor processor 120 and, optionally, the application processor 102 via a suitable communication bus 172. The communication bus 172 can be, for example, a low power dual double rate (LPDDR2) bus, or another suitable communication bus or link.

The computer-readable storage device 170 can be secured in a suitable manner to prevent changes to the respective algorithms 150-162. In another arrangement, the communications processor 104 can include a computer-readable storage device storing the algorithms 150-162 executed by the communications processor 104. Similarly, the sensor processor 120 can include a computer-readable storage device storing the algorithms 152-162 executed by the sensor processor 120. The respective computer-readable storage devices can be secured in a suitable manner to prevent changes to the respective algorithms 150-162.

Further, the present arrangements can be realized in hardware, or a combination of hardware and software. A typical combination of hardware and software can be a processing system, such as the communication device 100, with computer-readable program code that, when being loaded and executed by one or more processors, such as the processors 102, 104, 120, controls the processing system such that it carries out the executable operations and/or methods described herein. The algorithms 150-160 described herein also can be embedded in a computer program product comprising a non-transitory computer-readable storage medium, readable by a machine, tangibly embodying a program of instructions executable by the processing system, such as the communication device 100, to perform methods and processes described herein. The algorithms 150-160 also can be embedded in an application product which comprises all the features enabling the implementation of the methods described herein and, which when loaded in a processing system, such as the communication device 100, is able to carry out these methods.

FIG. 2 is a flowchart presenting a method 200 of controlling RF communications by a communication device, which is useful for understanding various arrangements described herein. At step 205, raw sensor data from at least one sensor can be received by a sensor processor. The sensor processor can process the raw sensor data to generate processed sensor data. The sensor processor is secured to prevent the user from changing computer program code executed by the sensor processor At step 210, at least a first portion of the processed sensor data can be received from the sensor processor by an application processor. The application processor can further process the first portion of the processed sensor data in at least one secured application executed by the application processor. The application processor can be configured to operate in a locked state in which a user is not allowed to alter the at least one secured application and operate in an unlocked state in which the user is allowed to alter the at least one secured application.

At step 215, at least a second portion of the processed sensor data can be received from the sensor processor by a communications processor. The communications processor can further process the second portion of the processed sensor data to control RF communications by the communication device. For example, the communications processor can control, based at least on the second portion of the processed sensor data, a transmit power level of the communication device to ensure the communication device complies with an applicable SAR specification. In one aspect, the communications processor can execute a SAR algorithm that processes the at least second portion of sensor data to control the transmit power level of the communication device. In another aspect, the sensor processor can execute a SAR algorithm that generates the second portion of the sensor data In one arrangement, the communications processor further can receive a third portion of the processed sensor data from the application processor. When the application processor is in the locked state, the third portion of the sensor data can be considered to be trusted sensor data and the communications processor controls the transmit power level of the communication device further based on the third portion of the processed sensor data. When the application processor is in the unlocked state, the third portion of processed sensor data is considered to be untrusted sensor data and not used by the communications processor to control the transmit power level of the communication device.

The second portion of the processed sensor data received by the communications processor from the sensor processor is trusted sensor data not affected by the application processor when the application processor operates in the unlocked state.

The communications processor is secured to prevent the user from changing computer program code executed by the sensor processor.

Optionally, at step 220, at least a third portion of the processed sensor data can be received from the sensor processor by at least one antenna tuner. The third portion of the processed sensor data can be further processed by the antenna tuner to control impedance matching between an antenna of the communication device and at least one other component of the communication device, wherein the third portion of the processed sensor data received by the antenna tuner from the sensor processor is trusted sensor data not affected by the application processor when the application processor operates in the unlocked state.

In another arrangement, a first antenna tuner algorithm can be executed by the sensor processor. The first antenna tuner algorithm can separate the trusted sensor data from untrusted sensor data. The sensor processor can communicate the trusted sensor data to a second antenna tuner algorithm executed by the communications processor. The second antenna tuner algorithm can process the trusted sensor data to determine antenna tuning to be performed by an antenna tuner. Corresponding antenna tuning data can be communicated by the communications processor to the antenna tuner. The antenna tuner can process the antenna tuning data to control impedance matching between an antenna of the communication device and at least one other component of the communication device.

The flowchart and block diagram in the figures illustrate the architecture, functionality, and operation of possible implementations of systems, methods and computer program products according to various embodiments described herein. In this regard, each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

Like numbers have been used to refer to the same items throughout this specification. The terminology used herein is for the purpose of describing particular embodiments only and is not intended to be limiting of the invention. The terms "a" and "an," as used herein, are defined as one or more than one. The term "plurality," as used herein, is defined as two or more than two. The term "another," as used herein, is defined as at least a second or more. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

Reference throughout this specification to "one arrangement," "an arrangement," or similar language means that a particular feature, structure, or characteristic described in connection with the embodiment is included in at least one arrangement disclosed within this specification. Thus, appearances of the phrases "in one arrangement," "in an arrangement," and similar language throughout this specification may, but do not necessarily, all refer to the same arrangement.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

These embodiments can be embodied in other forms without departing from the spirit or essential attributes thereof. Accordingly, reference should be made to the following claims, rather than to the foregoing specification, as indicating the scope of the embodiments.

What is claimed is:

1. A method of controlling RF communications by a communication device, comprising:
  receiving, by a sensor processor, raw sensor data from at least one sensor and processing, by the sensor processor, the raw sensor data to generate processed sensor data;
  receiving, by an application processor, at least a first portion of the processed sensor data from the sensor processor and further processing, by the application processor, the first portion of the processed sensor data in at least one secured application executed by the application processor, the application processor configured to operate in a locked state in which a user is not allowed to alter the at least one secured application and operate in an unlocked state in which the user is allowed to alter the at least one secured application; and
  receiving, by a communications processor, at least a second portion of the processed sensor data from the sensor processor and further processing, by the communications processor, the second portion of the processed sensor data to control RF communications by the communication device, wherein the second portion of the processed sensor data received by the communications processor from the sensor processor is trusted sensor data not affected by the application processor when the application processor operates in the unlocked state.

2. The method of claim 1, wherein:
the sensor processor is secured to prevent the user from changing computer program code executed by the sensor processor; and
the communications processor is secured to prevent the user from changing computer program code executed by the sensor processor.

3. The method of claim 1, wherein:
the communications processor controls, based at least on the second portion of the processed sensor data, a transmit power level of the communication device to ensure the communication device complies with an applicable specific absorption rate specification.

4. The method of claim 3, wherein:
the communications processor further receives a third portion of the processed sensor data from the application processor;
when the application processor is in the locked state, the third portion of the sensor data is considered to be trusted sensor data and the communications processor controls the transmit power level of the communication device further based on the third portion of the processed sensor data; and
when the application processor is in the unlocked state, the third portion of processed sensor data is considered to be untrusted sensor data and not used by the communications processor to control the transmit power level of the communication device.

5. The method of claim 3, wherein the communications processor executes a specific absorption rate algorithm that processes the at least second portion of sensor data to control the transmit power level of the communication device.

6. The method of claim 3, wherein the sensor processor executes a specific absorption rate algorithm that generates the second portion of the sensor data.

7. The method of claim 1, further comprising:
receiving, by at least one antenna tuner, at least a third portion of the processed sensor data from the sensor processor and further processing, by the antenna tuner, the third portion of the processed sensor data to control impedance matching between an antenna of the communication device and at least one other component of the communication device, wherein the third portion of the processed sensor data received by the antenna tuner from the sensor processor is trusted sensor data not affected by the application processor when the application processor operates in the unlocked state.

8. The method of claim 1, further comprising:
executing, by the sensor processor, a first antenna tuner algorithm that separates the trusted sensor data from untrusted sensor data, and communicating, by the sensor processor, the trusted sensor data to a second antenna tuner algorithm executed by the communications processor; and
processing, by the second antenna tuner algorithm, the trusted sensor data to determine antenna tuning to be performed by at least one antenna tuner, and communicating, by the communications processor, to the antenna tuner corresponding antenna tuning data, the antenna tuner processing the antenna tuning data to control impedance matching between an antenna of the communication device and at least one other component of the communication device.

9. A communication device, comprising:
at least one sensor generating raw sensor data;
a sensor processor receiving the raw sensor data from the at least one sensor and processing the raw sensor data to generate processed sensor data;
an application processor receiving at least a first portion of the processed sensor data from the sensor processor and further processing the first portion of the processed sensor data in at least one secured application executed by the application processor, the application processor configured to operate in a locked state in which a user is not allowed to alter the at least one secured application and operate in an unlocked state in which the user is allowed to alter the at least one secured application; and
a communications processor receiving at least a second portion of the processed sensor data from the sensor processor and further processing the second portion of the processed sensor data to control RF communications by the communication device, wherein the second portion of the processed sensor data received by the communications processor from the sensor processor is trusted sensor data not affected by the application processor when the application processor operates in the unlocked state.

10. The communication device of claim 9, wherein:
the sensor processor is secured to prevent the user from changing computer program code executed by the sensor processor; and
the communications processor is secured to prevent the user from changing computer program code executed by the sensor processor.

11. The communication device of claim 9, wherein:
the communications processor controls, based at least on the second portion of the processed sensor data, a transmit power level of the communication device to ensure the communication device complies with an applicable specific absorption rate specification.

12. The communication device of claim 11, wherein:
the communications processor further receives a third portion of the processed sensor data from the application processor;
when the application processor is in the locked state, the third portion of the sensor data is considered to be trusted sensor data and the communications processor controls the transmit power level of the communication device further based on the third portion of the processed sensor data; and
when the application processor is in the unlocked state, the third portion of processed sensor data is considered to be untrusted sensor data and not used by the communications processor to control the transmit power level of the communication device.

13. The communication device of claim 11, wherein the communications processor executes a specific absorption rate algorithm that processes the at least second portion of sensor data to control the transmit power level of the communication device.

14. The communication device of claim 11, wherein the sensor processor executes a specific absorption rate algorithm that generates the second portion of the sensor data.

15. The communication device of claim 9, further comprising:
at least one antenna tuner, the antenna tuner receiving at least a third portion of the processed sensor data from the sensor processor and further processing the third portion of the processed sensor data to control impedance matching between an antenna of the communication device and at least one other component of the communication device, wherein the third portion of the processed sensor data received by the antenna tuner from the sensor processor is trusted sensor data not affected by the application processor when the application processor operates in the unlocked state.

16. The communication device of claim 9, further comprising:
at least one antenna tuner;
wherein the sensor processor executes a first antenna tuner algorithm that separates the trusted sensor data from untrusted sensor data, and communicates the trusted sensor data to a second antenna tuner algorithm executed by the communications processor; and
the second antenna tuner algorithm processes the trusted sensor data to determine antenna tuning to be performed by the antenna tuner, and communicates to the antenna tuner corresponding antenna tuning data, the antenna tuner processing the antenna tuning data to control impedance matching between an antenna of the communication device and at least one other component of the communication device.

17. A computer program product for controlling RF communications by a communication device, said computer program product comprising:
a computer-readable storage device having stored thereon program code that, when executed, configures a processor to perform executable operations comprising:
receiving, by a sensor processor, raw sensor data from at least one sensor and processing, by the sensor processor, the raw sensor data to generate processed sensor data;
receiving, by an application processor, at least a first portion of the processed sensor data from the sensor processor and further processing, by the application processor, the first portion of the processed sensor data in at least one secured application executed by the application processor, the application processor configured to operate in a locked state in which a user is not allowed to alter the at least one secured application and operate in an unlocked state in which the user is allowed to alter the at least one secured application; and
receiving, by a communications processor, at least a second portion of the processed sensor data from the sensor processor and further processing, by the communications processor, the second portion of the processed sensor data to control RF communications by the communication device, wherein the second portion of the processed sensor data received by the communications processor from the sensor processor is trusted sensor data not affected by the application processor when the application processor operates in the unlocked state.

18. The computer program product of claim 17, wherein:
the sensor processor is secured to prevent the user from changing computer program code executed by the sensor processor; and
the communications processor is secured to prevent the user from changing computer program code executed by the sensor processor.

19. The computer program product of claim 17, wherein:
the communications processor controls, based at least on the second portion of the processed sensor data, a transmit power level of the communication device to ensure the communication device complies with an applicable specific absorption rate specification.

20. The computer program product of claim 19, wherein:
the communications processor further receives a third portion of the processed sensor data from the application processor;
when the application processor is in the locked state, the third portion of the sensor data is considered to be trusted sensor data and the communications processor controls the transmit power level of the communication device further based on the third portion of the processed sensor data; and
when the application processor is in the unlocked state, the third portion of processed sensor data is considered to be untrusted sensor data and not used by the communications processor to control the transmit power level of the communication device.

\* \* \* \* \*